United States Patent [19]

Gustafson et al.

[11] Patent Number: 5,068,057

[45] Date of Patent: Nov. 26, 1991

[54] CONVERSION OF CARBON DIOXIDE TO CARBON MONOXIDE

[75] Inventors: Bruce L. Gustafson; James V. Walden, both of Kingsport, Tenn.

[73] Assignee: Eastman Kodak Company, Rochester, N.Y.

[21] Appl. No.: 565,838

[22] Filed: Aug. 13, 1990

Related U.S. Application Data

[63] Continuation-in-part of Ser. No. 364,755, Jun. 12, 1989, abandoned.

[51] Int. Cl.$^5$ .............................. C01B 3/40; C01B 3/38
[52] U.S. Cl. ........................................................ 252/373
[58] Field of Search ........................................... 252/373

[56] References Cited

U.S. PATENT DOCUMENTS 4,690,777 9/1987 Valenyi et al. ...................... 352/373

FOREIGN PATENT DOCUMENTS 84273 7/1983 European Pat. Off. .

1200195 9/1986 Japan ................................... 252/373

OTHER PUBLICATIONS

Masai et al., "Methane Reforming by Carbon Dioxide and Steam Over Supported Pd, Pt, and Rh Catalysts", in Studies in Surface Science and Catalysis, vol. 36, pp. 67–71 (1988).

*Primary Examiner*—Howard T. Mars
*Attorney, Agent, or Firm*—J. Frederick Thomsen; William P. Heath, Jr.

[57] ABSTRACT

Method for the conversion of carbon dioxide to a carbon monoxide-rich synthesis gas mixture is disclosed. The invention method comprises contacting carbon dioxide with at least one hydrocarbon in the presence of a catalyst consisting essentially of a metal selected from platinum of palladium supported on an alumina or silica-alumina support which is stable under the reaction conditions. The invention reaction is typically carried out at a temperature in the range of about 650° C. up to 1000° C. at a gas hourly space velocity in the range of about 100 up to 50,000 volumes per hour.

14 Claims, No Drawings

CONVERSION OF CARBON DIOXIDE TO CARBON MONOXIDE

This application is a continuation-in-part of our copending application Ser. No. 07/364,755 filed June. 12, 1989 now abandoned.

This invention relates to the conversion of carbon dioxide to carbon monoxide. In one aspect, this invention relates to the reforming of hydrocarbon/carbon dioxide mixtures to produce synthesis gas. In another aspect, the present invention relates to the production of carbon monoxide-rich synthesis gas mixtures.

BACKGROUND

The catalytic steam reforming of mixtures of methane and carbon dioxide to produce mixtures of hydrogen and carbon monoxide has been practiced for many years on a commercial scale. One of the disadvantages associated with the production of synthesis gas by the steam reforming of methane and is that the product gas mixtures are limited by the reaction stoichiometry to hydrogen/carbon monoxide ratios of 3:1 or higher. The addition of carbon dioxide to a steam reformer can result in lower hydrogen/carbon monoxide ratios, but requires the removal of steam from the product gas stream. It would be desirable, for a variety of applications such as hydroformylations, carbonylations, and the like, to be able to directly produce carbon monoxide-rich synthesis gas mixtures. The catalysts of choice employed for commercially practiced catalytic steam reforming of mixtures of methane and carbon dioxide are nickel-based catalysts. These catalysts suffer from severe deactivation if the reaction temperature is too low (i.e., if reaction temperature falls below about 500° C.). In addition, these catalyst systems also suffer severe deactivation when employed for the reforming of mixtures of methane and carbon dioxide if the reforming reaction is carried out in the substantial absence of water. It would be desirable, therefore, to have available catalyst systems which were resistant to deactivation when employed for the reforming of mixtures of hydrocarbons and carbon dioxide in the substantial absence of water. Indeed, it would be most desirable, in terms of reduced energy requirements, simplified materials handling, and the like, to be able to carry out the reforming of hydrocarbons such as methane even in the substantial absence of water.

STATEMENT OF THE INVENTION

In accordance with the present invention, it has been discovered that the continuous reforming of hydrocarbons with carbon dioxide can be carried out under substantially anhydrous conditions to produce a carbon monoxide-rich product stream. The reforming reaction of the invention proceeds smoothly with no apparent loss in catalyst activity, in spite of the substantial absence of water in the reaction mixture. The reforming reaction also provides a product stream which is rich in carbon monoxide, especially when compared to product streams obtained from conventional methane steam reforming processes.

DETAILED DESCRIPTION OF THE INVENTION

In accordance with the present invention, there is provided a process for the continuous preparation of a mixture of hydrogen and carbon monoxide having in a mole ratio of about 1:1.5 to 2:1 by continuously contacting a substantially anhydrous feed mixture consisting essentially of carbon dioxide with at least one hydrocarbon with a fixed bed of a supported catalyst consisting essentially of 0.1 to 2.0 weight percent, based on the weight of the catalyst, of a metal selected from platinum or palladium on an alumina or silicaalumina support at a temperature of about 650° to 1000° C. at a gas hourly space velocity of about 100 up to 50,000 hr.$^{-1}$; wherein (1) the hydrocarbon has the empirical formula $C_nH_{2n}$ or $C_{n'}H_{2n'+2}$ wherein n is 2 to 6 and n' is 1 to 6; and (2) the mole ratio of carbon dioxide to $$\frac{\text{moles hydrocarbon}}{n} \text{ or } \frac{\text{moles hydrocarbon}}{n'}$$

in the feed mixture is about 1:2 to 2:1.

Hydrocarbons contemplated for use in the practice of the present invention are hydrocarbons having the empirical formula $C_nH_{2n}$ or $C_{n'}H_{2n'+2}$ wherein n is a whole number which falls in the range of 2 up to 6 and n' is a whole number which falls in the range of 1 up to 6. Exemplary paraffins include methane, ethane, propane, butane, pentane, hexane and the like, with presently preferred paraffins including methane, ethane, propane, and butane. Exemplary olefins include ethylene, propylene, butene, pentene, hexene and the like, with presently preferred olefins including ethylene, propylene, and butene.

Catalysts contemplated for use in the practice of the present invention consist essentially of a metal selected from platinum or palladium supported on an alumina or silica-alumina support material which is stable under the reaction conditions. Support materials which satisfy the above criteria include alumina, silica, silica-alumina, molecular sieves, kieselguhr, mineral clays, and the like. Alumina is the presently most preferred support material because of its ready availability and ease of handling. The preferred catalyst consist essentially of 1.0 to 1.5 weight percent, based on the weight of the catalyst, of a metal selected from platinum or palladium on an alumina support.

Those of skill in the art recognize that catalyst supports having a wide variety of shapes and sizes can be employed. The particular size and shape employed will typically vary as a function of plant design, reactor configuration, pressure drop across the reaction zone, etc. Such shapes as spheres, pellets, saddles, rings, and the like, are suitable for use in the practice of the present invention.

The amount of palladium or platinum metal deposited on the catalyst support can vary widely. Typically about 0.1 up to 2 wt. % metal will be applied to the catalyst support. Presently preferred loading levels fall in the range of about 0.1 up to 1.5 wt. % metal on the catalyst support.

Catalysts useful in the practice of the present invention are readily prepared using catalyst preparation techniques well known in the art. The actual method of catalyst preparation will have little effect on performance so long as suitable support and appropriate metal loading levels are employed.

The invention reforming reaction is typically carried out at a temperature in the range of about 650° C. up to 1000° C. and at a gas hourly space velocity in the range of about 100 up to 50,000 volumes per hour. Presently preferred reaction temperatures for carrying out the invention reforming reaction fall in the range of about 700° C. up to 900° C., with presently preferred gas hourly space velocities falling within the range of about 300 up to 10,000 volumes per hour.

The invention reforming process is not particularly sensitive to reaction pressure. Thus, the pressure of operation can vary from sub-atmospheric to superatmospheric. The actual reaction pressure employed will be determined by any equipment limitations as well as by the equilibrium conversion desired. It is well known in the art that the reaction pressure for reforming reactions effects the equilibrium conversion levels. Thus, higher reaction pressures typically result in lower levels of conversion while lower reaction pressures typically result in higher levels of conversion.

Typically, the invention reaction will be carried out at a pressure in the range of about 0.5 Bar up to 20 Bar. Presently preferred reaction pressures fall in the range of about 1 up to 12 Bar.

A particular advantage of the present invention is the ability to carry out reforming of hydrocarbons using an essentially anhydrous feed of carbon dioxide and hydrocarbon. The process of the present invention has the further benefits of reduced energy requirements (recycle of steam used in steam reforming processes), improved catalyst support integrity (because exposure to steam is minimized) and reduced separation requirements (removal of steam from $CO/H_2$ product stream). Yet another advantage of the process is that the catalysts which may be used are commercially available from catalyst vendors and do not require any special components or techniques of manufacture.

The invention will now be described in greater detail with reference to the following nonlimiting examples.

EXAMPLE 1

A sample (33.5 g) of 1% $Pt/Al_2O_3$ catalyst (Engelhard Industries #G-809, T-355, ⅛-inch pellets) was placed in a 1-inch quartz reactor tube and heated at atmospheric pressure to 850° C. in a flow (148 standard cubic centimeters per minute; sccm) of pure $CO_2$. Once the reactor had achieved the desired temperature, the reaction between $CO_2$ and $CH_4$ was initiated. The results obtained using a $CO_2/CH_4$ feed ratio of 0.9:1.0 and a total feed rate of 486 sccm at varying reaction temperatures are given in Table 1.

TABLE I

| Run # | Temperature | Mole % in Product | | | |
|---|---|---|---|---|---|
| | | $CO_2$ | $CH_4$ | CO | $H_2$ |
| 1 | 500° C. | 47.3 | 52.7 | 0.0 | 0.0 |
| 2 | 650° C. | 14.1 | 15.8 | 39.0 | 31.1 |
| 3 | 700° C. | 5.9 | 6.1 | 47.5 | 35.2 |
| 4 | 750° C. | 3.9 | 2.4 | 50.9 | 42.7 |
| 5 | 800° C. | 3.0 | 1.0 | 53.9 | 42.2 |
| 6 | 850° C. | 2.9 | 0.86 | 50.9 | 44.4 |

These results demonstrate that $Pt/Al_2O_3$ is effective for the conversion of $CO_2$ and $CH_4$ to form CO and $H_2$. In addition, these results show that operation of $Pt/Al_2O_3$ at 500° C. does not result in conversion of $CH_4$ and $CO_2$ to products as stated by Masai and coworkers (Stud. Sur. Sci. Catal. 36, 67, 1988).

EXAMPLE 2

The $Pt/Al_2O_3$ catalyst described in Example 1 was employed under the same conditions described in Example 1 except that the temperature was held constant at 850° C. and the $CO_2/CH_4$ feed ratio was varied from 0.16:1 to 1.53:1. Results from these evaluations are given in Table 2.

TABLE 2

| Run # | $CO_2/CH_4$ | Mole % in Product | | | |
|---|---|---|---|---|---|
| | | $CO_2$ | $CH_4$ | CO | $H_2$ |
| 7 | 0.16 | 0.12 | 53.0 | 24.0 | 22.8 |
| 8 | 0.32 | 0.15 | 26.2 | 36.5 | 37.1 |
| 9 | 0.60 | 0.76 | 9.9 | 50.7 | 38.8 |
| 10 | 0.91 | 3.20 | 0.98 | 55.3 | 40.6 |
| 11 | 1.53 | 15.3 | 0.20 | 51.6 | 32.9 |

These results demonstrate that $Pt/Al_2O_3$ is effective over a wide range of feed gas compositions but that the use of very low $CO_2/CH_4$ ratios (Runs 7 and 8) gives a product gas mixture containing substantial amount of unconverted methane.

EXAMPLE 3

The $Pt/Al_2O_3$ catalyst described in Example 1 was employed under the same conditions described in Example 1 except that the feed rate was varied while holding the feed ratio and reaction temperature constant. The results obtained for these conditions are given in Table 3.

TABLE 3

| Run # | W/F* | Mole % in Product | | | |
|---|---|---|---|---|---|
| | | $CO_2$ | $CH_4$ | CO | $H_2$ |
| 12 | 0.069 | 2.9 | 0.85 | 50.4 | 44.0 |
| 13 | 0.098 | 2.8 | 0.82 | 50.8 | 45.5 |
| 14 | 0.134 | 3.2 | 0.98 | 55.5 | 40.6 |
| 15 | 0.171 | 3.2 | 1.10 | 51.2 | 44.4 |
| 16 | 0.226 | 4.1 | 1.10 | 54.9 | 40.4 |

*Ratio of the weight of catalyst/feed rate in sccm.

These results indicate that the invention process can be operated under a range of feed conditions.

EXAMPLE 4

A sample of 0.3% $Pt/Al_2O_3$ (Calsicat #39D-67B, 8×14 mesh spheres) was employed under the same reaction conditions as described in Example 2. Results from this evaluation are set forth in Table 4, and are compared to those obtained in Run No. 10 (see Table 2).

TABLE 4

| Wt % Pt | Mole % in Product | | | |
|---|---|---|---|---|
| | $CO_2$ | $CH_4$ | CO | $H_2$ |
| 0.3 | 15.5 | 28.5 | 36.1 | 20.8 |
| 1.0 | 3.2 | .98 | 55.3 | 40.6 |

These results indicate that reduced Pt loading levels can be used to achieve CO and $H_2$ production from a $CO_2/CH_4$-containing feed.

EXAMPLE 5

A sample of commercial Ni steam reforming catalyst (BASF G1-25S; 15 wt % NiO on a ceramic carrier having an initial crush strength of greater than 35 Kg) was employed under the same conditions as described in Example 2. During the initial two hours of operation, the product gas stream contained 47% CO, 50% $H_2$, 0.7% $CO_2$, and 1.2% $CH_4$. Following 80 minutes on stream, the system was shut down due to excessive backpressure caused by carbon buildup and catalyst degradation. The used catalyst had no crush strength.

This example demonstrates that, while Ni-based catalysts exhibit short-term activity for the catalytic reforming of $CH_4$ with $CO_2$ in the absence of water, $Pt/Al_2O_3$ catalysts are superior to Ni due to improved physical properties.

EXAMPLE 6

A sample (34 g) of 0.5% $Pd/Al_2O_3$ (Baker #3107) was employed under the same conditions as described in Runs 3–6 above (see Table 1). Results from these evaluations are given in Table 5.

TABLE 5

| Temperature | Mole % in Product | | | |
|---|---|---|---|---|
| | $CO_2$ | $CH_4$ | CO | $H_2$ |
| 700 | 38.9 | 41.7 | 12.5 | 9.4 |
| 750 | 15.0 | 22.3 | 34.4 | 28.1 |
| 800 | 5.3 | 9.8 | 43.9 | 40.6 |
| 850 | 3.8 | 7.8 | 45.3 | 42.9 |

These results indicate that $Pd/Al_2O_3$ is effective for the conversion of $CH_4$ and $CO_2$ into CO and $H_2$ in the absence of $H_2O$ in the feed.

EXAMPLE 7

The $Pd/Al_2O_3$ described in Example 6 was employed under the same conditions as described in Example 2, except that the feed ratio of $CO_2/CH_4$ was varied from 0.16:1 to 1.81:1. The results obtained under these conditions are given in Table 6.

TABLE 6

| $CO_2/CH_4$ | Mole % in Product | | | |
|---|---|---|---|---|
| | $CO_2$ | $CH_4$ | CO | $H_2$ |
| 0.16 | 0.42 | 40.1 | 17.9 | 41.2 |
| 0.32 | 1.40 | 22.8 | 26.3 | 48.0 |
| 0.90 | 2.80 | 7.3 | 46.3 | 43.4 |
| 1.29 | 7.30 | 3.5 | 48.5 | 40.3 |
| 1.81 | 15.0 | 2.5 | 46.9 | 35.0 |

These results indicate that $Pd/Al_2O_3$ is active for the conversion of $CO_2/CH_4$ feed in the substantial absence of water to produce $CO/H_2$ over a wide range of feed compositions.

EXAMPLE 8

A sample of the 1% $Pt/Al_2O_3$ described in Example 1 was employed under the same conditions as described in Run No. 6 above (see Table 1), except that n-butane was used in place of methane and the feed ratio of $CO2/C_4H,o$ was 4. The product gas contained 59.8% CO, 8.4% $CO_2$, 30.7% $H_2$ and <1% $C_4H_{10}$.

These results of this experiment demonstrate that $Pt/Al_2O_3$ is effective for the catalytic reforming of higher hydrocarbons with $CO_2$ to produce $CO/H_2$.

The invention has been described in detail with particular reference to preferred embodiments thereof, but it will be understood that variations and modifications can be effected within the spirit and scope of the invention.

We claim:

1. Process for the continuous preparation of a mixture of hydrogen and carbon monoxide in a mole ratio of about 1:1.5 to 2:1 which comprises continuously contacting a substantially anhydrous feed mixture consisting essentially of carbon dioxide and at least one hydrocarbon with a fixed bed of a supported catalyst consisting essentially of 0.1 to 2 weight percent, based on the weight of the catalyst, of a metal selected from platinum or palladium on an alumina or silica-alumina support at a temperature of about 650° to 1000° C. at a gas hourly space velocity of about 100 to 50,000; wherein (1) the hydrocarbon has the empirical formula $C_nH_{2n}$ or $C_{n'}H_{2n'+2}$ wherein n is 2 to 6 and n' is 1 to 6;

(2) wherein the mole ratio of carbon dioxide to $$\frac{\text{moles hydrocarbon}}{n} \text{ or } \frac{\text{moles hydrocarbon}}{n'}$$

mixture is about 1:2 to 2:1.

2. A method in accordance with claim 1 wherein said hydrocarbon is selected from methane, ethane, propane, butane, or mixtures of any two or more thereof.

3. A method in accordance with claim 1 wherein said hydrocarbon is methane.

4. A method in accordance with claim 1 wherein said hydrocarbon is ethane.

5. A method in accordance with claim 1 wherein said hydrocarbon is propane.

6. A method accordance with claim 1 wherein said hydrocarbon is butane.

7. A method in accordance with claim 1 wherein said catalyst contains in the range of about 0.1 up to 1.5 weight percent metal on said support.

8. A method in accordance with claim 7 wherein said metal is platinum.

9. A method in accordance with claim 7 wherein said metal is palladium.

10. A method in accordance with claim 1 wherein said support is alumina.

11. A method in accordance with claim 1 wherein said contacting is carried out at a temperature in the range of about 700° C. up to 900° C.

12. A method in accordance with claim 11 wherein said contacting is carried out at a pressure in the range of about 0.5 Bar up to 20 Bar.

13. A method in accordance with claim 1 wherein said contacting is carried out at a pressure in the range of about 1 up to 12 Bar.

14. A method in accordance with claim 1 wherein the gas hourly space velocity of said contacting is within the range of about 300 to 10,000 hr.$^{-1}$.

* * * * *